Patented Mar. 21, 1944

2,344,843

UNITED STATES PATENT OFFICE 2,344,843

OXIDATION OF SYNTHETIC LATEX

Victor E. Wellman, Silver Lake, Ohio, assignor to The B. F. Goodrich Company, New York, N. Y., a corporation of New York No Drawing. Application March 12, 1940, Serial No. 323,575

15 Claims. (Cl. 260—32)

This invention relates to a method of treating synthetic rubber-like copolymers whereby the plasticity and workability of the same are greatly improved. In more particular, this invention relates to a controlled process of oxidizing latex-like emulsions containing said rubber-like copolymers.

Among the rubber-like copolymers to which the present invention is applicable are the copolymers derived from mixtures including a conjugated butadiene hydrocarbon, such as butadiene-1, 3 (commonly called butadiene), and another unsaturated compound capable of copolymerizing therewith such as acrylonitrile, styrene, vinyl naphthalene, methyl methacrylate, methyl vinyl ketone and the like. It is well recognized that these materials possess many properties desirable in synthetic rubber. However, their plasticity is such that considerable difficulty is encountered in ordinary processing operations such as masticating, compounding, shaping, moulding, extruding, fabricating and vulcanizing. For example, continued mastication or milling is not effective in reducing these materials to any desired state of plasticity. Consequently, it has frequently been an expedient in former compounding practice to incorporate relatively large amounts of softeners or plasticizers with the synthetic rubber in order to facilitate further processing with the result, however, that the mechanical strength of the final vulcanized products is, necessarily, lowered.

In the process of preparing the above mentioned rubber-like copolymers it is usually desirable to carry out the polymerization in the form of an emulsion. In the usual polymerization process a liquid mixture of monomers such as a mixture of butadiene and acrylonitrile is emulsified with water in the presence of an emulsifying agent such as soap and a polymerization catalyst such as hydrogen peroxide, and the emulsion thus formed is agitated at a convenient temperature, say from 10 to 80° C., until polymerization is complete. The copolymer is thus obtained in a milky latex-like emulsion. In prior practice great care has been taken to avoid any effect of atmospheric oxygen on the copolymer latex by adding an age-resister or antioxidant, such as phenyl beta-naphthylamine just as quickly as possible after removal of the latex from reaction vessel. It has been assumed that any action of oxygen on the copolymer latex would result in a degradation of the polymer chains and a lowering of the physical properties of the copolymer.

It is most surprising, therefore, that I have now discovered that contrary to expectations and to prior practices it is definitely desirable to oxidize the synthetic copolymer particles while dispersed as latex, particularly so if the oxidation is not vigorous and is capable of being controlled. The desirable effects of this procedure have been manifested not only in improved plasticity, milling characteristics and dispersion of pigments in the copolymer when finally coagulated and processed, but also in the mechanical strength of vulcanized products prepared from copolymers which have been so treated.

Accordingly, this invention comprises oxidizing synthetic copolymer latices and in a preferred embodiment it comprises oxidizing the copolymer latex in such a manner that the copolymer is preplasticized without being mechanically weakened. The oxidation may be accomplished by a number of different methods. The latex may be allowed to stand in an atmosphere of an oxidizing gas such as air, oxygen, ozone or ozonised air prior to coagulation or one or more of these gasses may be bubbled through the latex. Instead of air, oxygen or ozone, hydrogen peroxide, organic peroxides or compounds containing loosely bound oxygen such as sodium perborate, sodium chlorate, ammonium persulfate, sodium hypochlorite and the like, may be added to the latex to effect oxidation provided however that the substance added is substantially neutral so as not to coagulate the latex upon its addition.

The effect produced on the copolymer by oxidation seems to be related not only to the amount or degree of oxidation but also to the type or nature of such oxidation. Oxidation in the presence of restricted amounts of an oxidizing agent improves both the plasticity and milling characteristics as well as the physical or mechanical properties of the copolymer. However for the attainment of optimum mechanical properties (tensile strength, elongation, etc.) in vulcanized products from the copolymers, oxidation of the latex must not be too prolonged otherwise there occurs a mechanical weakening of the copolymer and its vulcanizate. On the other hand, the plasticity of the copolymer increases with continued oxidation. Hence, for most purposes it is desirable that the oxidation proceed only to a degree corresponding with optimum strength and plasticity of the copolymer while, possibly, for other purposes it will be advantageous to continue oxidation to a point corresponding with optimum plasticity alone.

The beneficial effect of oxidizing the latex is quite contrary to the effect of oxidizing the massive coagulated copolymer in the absence of antioxidant. In the latter case there occurs a general deterioration of the copolymer as shown by reduced pasticity on the mill and lowered tensile strength and elongation of vulcanized products made therefrom. All these facts suggest that several distinct and different types of oxidation of a copolymer may occur depending upon the condition of the copolymer and the conditions for the oxidation. A possible explanation of the beneficial latex oxidation is that a joining together of the polymer chains is brought about thereby increasing the average chain length and improving the physical properties of the copolymer. Continued latex oxidation may split some of the polymer chains causing a weakening of mechanical properties but an increase in plasticity. Finally, oxidation of the massive copolymer completely degrades the entire copolymer structure.

In the actual practice of this invention, the conditions necessary to bring about the most desirable type of oxidation have been determined and may readily be controlled. If, for example, the oxidation is being carried out by the addition of hydrogen peroxide, or an equivalent for the purpose, to the latex, it is necessary only to add the substance in such concentrations that the desired degree of oxidation occurs. For most purposes, concentrations from 5 to 50 milligrams of liberated oxygen per 100 c. c. of the latex are most effective. Since the latex ordinarily contains about 25% by weight of the copolymer, this corresponds to a liberated oxygen content of from 20 to 200 milligrams per 100 g. of the copolymer or 0.02 to 0.2% by weight on the copolymer. On the other hand, if oxidation is effected by the use of air, ozone or oxygen, it will be necessary to bubble the gas through the latex until the desired oxygen content is reached. This will, of course, depend upon the temperature and pressure of operation and the particular gas employed. For example, if 1% ozone in air is bubbled through 100 c. c. of a butadiene acrylonitrile latex at the rate of 300 cc. per hr. at 20° C. only five minutes are required while if air is used under similar conditions the oxidation will require over 4 hours. It is obvious that if the latex is allowed to stand in an atmosphere of an oxidizing gas, the length of time of standing will depend upon the gas used and also upon its diffusibility in the latex. Butadiene acrylonitrile latex may stand in air for as long as 8 days before weakening in the properties of the copolymer is observed.

It should be mentioned that in case the oxidizing substance is added in a single application to the latex, as for example adding hydrogen peroxide in contrast to bubbling an oxidizing gas, most desirable results are obtained by allowing the latex to stand for 4 to 24 hours before coagulation and after addition of the oxidant. It should further be noted that the results of the present invention are not accomplished by the addition of the oxidant before polymerization is effected, since in most cases the oxidizing agent then functions as a polymerization catalyst and is used up during the polymerization process.

Latices which have been treated as hereinabove described may subsequently be coagulated by the methods ordinarily used to coagulate synthetic rubber latices and antioxidants or age resistors may be added at the time of coagulation. The age resistor prevents further oxidation of the synthetic rubber after coagulation and also tends to counteract the effect of excessive oxidizing agent if such has inadvertently been added. Reducing agents could also perform the latter function.

The beneficial effect of allowing a synthetic rubber latex to be oxidized before coagulation may be shown by a comparison of the tensile strength and per cent elongation of butadiene-acrylonitrile copolymer vulcanized stocks prepared from copolymers whose latices have been subjected to the action of different atmospheres. The following table shows this comparison.

| Hrs. latex exposed | Under air | | Under N₂ | | Under O₂ | | Under H₂ | |
|---|---|---|---|---|---|---|---|---|
| | Ten. | Elong. | Ten. | Elong. | Ten. | Elong. | Ten. | Elong. |
| 24 | 4,900 | 570 | 4,330 | 470 | 4,720 | 610 | 3,830 | 520 |
| 144 | 4,980 | 520 | 3,900 | 390 | 6,000 | 590 | 3,950 | 410 |

It will be observed that exposure to the oxidizing gases produced a marked increase in physical properties of the vulcanizates but the non-oxidizing gases did not bring about this result.

The method of carrying out this invention and the desirable results obtained thereby may further be illustrated by comparing the properties of copolymers which have been treated in the usual way with the properties of copolymers whose latices have been oxidized. This comparison has been made by carrying out a series of experiments in which all factors except the treatment of the emulsion before coagulation were held constant. In all experiments the latex was that obtained by the emulsion polymerization of a mixture of butadiene and acrylonitrile, the emulsion being made up as follows:

| | | |
|---|---|---|
| Butadiene | lbs | 119.5 |
| Acrylonitrile | lbs | 40 |
| Water | gal | 48 |
| Palmitic acid | lbs | 7.5 |
| Sodium hydroxide | lbs | .97 |
| 3% aqueous sol. of hydrogen peroxide | gal | .20 |

The emulsion was then polymerized by constant agitation for 48 hrs. at a temperature of 60° C. One hundred cubic centimeter portions of this latex were treated as shown hereinafter, and after treatment the various portions were coagulated by the addition of alcohol and a saturated salt solution. After filtering, washing, and drying the precipitated copolymers, the rubber-like crumbs thereof were placed on an experimental two-roll mixing mill and broken down for five minutes. An index of the miling behaviour, plasticity, and "nerve" of the copolymers at this stage was then determined by measuring the length of a sheet, expressed in centimeters per gram, obtained by passing the copolymer through the tightly closed rollers. This value is termed hereinafter "extrusion." Milling and compounding of the various copolymer samples was continued for thirty minutes. The recipe used in compounding follows:

| | Parts |
|---|---|
| Butadiene acrylonitrile copolymer | 100 |
| Channel black | 50 |
| Zinc oxide | 5 |
| Phenyl-beta-naphthyl amine | .75 |
| Pine tar | 5 |
| Sulphur | 2 |
| Litharge | 10 |

Samples of the compounded stocks were then submitted to a 30 minute cure at 310° F., and the tensile strength and elongation of the various vulcanizates were determined.

As hereinabove mentioned, individual experiments differed only in the treatment of the latex before coagulation. Various treatments were as follows:

(1) 3% of phenyl-beta-naphthyl amine based on the copolymer was added to 100 c. c. of latex and the latex coagulated. This experiment represents the prior practice and was used as a control.

(2) The latex was allowed to stand in an atmosphere of air for (a) 1 day, (b) 4 days and (c) 8 days.

(3) The latex was allowed to stand in an atmosphere of oxygen for (a) 1 day and (b) 4 days.

(4) Air was bubbled at the rate of 100–400 c. c. per hour through the latex for (a) 4 hrs. and (b) 18 hrs.

(5) One percent ozone in air was bubbled at the same rate as in (4) through the latex for (a) 2 minutes (b) 5 minutes (c) 15 minutes.

(6) A 30% solution of hydrogen peroxide was added to the latex as follows:

(a) 0.1 c. c.—latex allowed to stand 4 hrs.
(b) 0.1 c. c.—latex allowed to stand 18 hrs.
(c) 0.2 c. c.—latex allowed to stand 4 hrs.
(d) 0.2 c. c.—latex allowed to stand 18 hrs.

(7) A solution of sodium hypochlorite containing 4.8% available chlorine was added to the latex as follows:

(a) 2 c. c.—latex allowed to stand 18 hrs.
(b) 4 c. c.—latex allowed to stand 18 hrs.

The results of these experiments are shown in the following table:

| Experiment | Extrusion | Tensile | Elongation |
| --- | --- | --- | --- |
| (1) | 4.5 | 3,450 | 410 |
| (2): | | | |
| (a) | 5.9 | 3,800 | 450 |
| (b) | 5.4 | 3,600 | 450 |
| (c) | 5.9 | 3,950 | 470 |
| (3): | | | |
| (a) | 5.6 | 3,800 | 480 |
| (b) | 5.9 | 4,400 | 510 |
| (4): | | | |
| (a) | 5.6 | 3,750 | 450 |
| (b) | 5.8 | 4,000 | 430 |
| (5): | | | |
| (a) | 5.6 | 4,200 | 500 |
| (b) | 5.8 | 3,800 | 470 |
| (c) | 6.1 | 3,500 | 410 |
| (6): | | | |
| (a) | 6.7 | 3,600 | 440 |
| (b) | 5.4 | 3,700 | 490 |
| (c) | 5.9 | 3,750 | 470 |
| (d) | 5.3 | 3,700 | 470 |
| (7): | | | |
| (a) | 5.5 | 3,900 | 450 |
| (b) | 5.2 | 3,800 | 450 |

The advantages and usefulness of my invention are apparent from the foregoing disclosure. By the practice of this invention it becomes possible to prepare synthetic rubber-like products having greater mechanical strength with considerably less difficulty in plasticizing and processing the rubber-like material. A saving in power is also effected since by the use of this invention the masticating time is lowered. It also becomes possible to prepare plastic synthetic-rubber stocks without the use of undue quantities of softeners.

While I have herein disclosed with considerable particularity certain preferred manners of performing my invention, I do not desire or intend to limit myself solely thereto inasmuch as the procedure may be modified, the precise proportions of the materials utilized may be varied and other equivalent materials may be employed without departing from the spirit and scope of the invention as defined in the appended claims.

I claim:

1. The method of improving the properties of an elastic rubbery copolymer contained in a latex prepared by the polymerization in aqueous emulsion of a mixture including a conjugated butadiene hydrocarbon and a minor proportion of an unsaturated organic compound copolymerizable therewith in aqueous emulsion to form an elastic rubbery copolymer, which comprises subjecting said latex, while in the freshly prepared and unstabilized condition, to the action of an oxygen supplying agent for a time sufficient materially to increase the plasticity of the copolymer contained in said latex and thereafter stabilizing said latex by the addition of an antioxidant.

2. The method of improving the properties of an elastic rubbery copolymer contained in a latex prepared by the polymerization in aqueous emulsion of a mixture including a conjugated butadiene hydrocarbon and a minor proportion of an unsaturated organic compound copolymerizable therewith in aqueous emulsion to form an elastic rubbery copolymer, which comprises subjecting said latex, while in the freshly prepared and unstabilized condition, to the action of an oxygen supplying gas for a time sufficient materially to increase the plasticity of the copolymer contained in said latex and thereafter stabilizing said latex by the addition of an antioxidant.

3. The method of improving the properties of an elastic rubbery copolymer contained in a latex prepared by the polymerization in aqueous emulsion of a mixture including a conjugated butadiene hydrocarbon and a minor proportion of an unsaturated organic compound copolymerizable therewith in aqueous emulsion to form an elastic rubbery copolymer, which comprises adding a substantially neutral oxygen liberating substance to said latex while the latex is in the freshly prepared and unstabilized condition, allowing said latex to stand for a time sufficient materially to increase the plasticity of the copolymer contained in said latex and thereafter stabilizing said latex by the addition of an antioxidant.

4. The method of improving the properties of an elastic rubbery copolymer contained in a latex prepared by the polymerization in aqueous emulsion of a mixture including a conjugated butadiene hydrocarbon and a minor proportion of an unsaturated organic compound copolymerizable therewith in aqueous emulsion to form an elastic rubbery copolymer which comprises subjecting said latex, while in the freshly prepared and unstabilized condition, to the action of an oxygen supplying agent for a time sufficient to increase the plasticity and mechanical strength of the copolymer contained in said latex and thereafter stabilizing said latex by the addition of an antioxidant.

5. The process of producing an elastic rubbery copolymer having improved plasticity and strength which comprises subjecting a mixture including a conjugated butadiene hydrocarbon and a minor proportion of an unsaturated organic compound copolymerizable therewith in aqueous emulsion to form an elastic rubbery copolymer, to polymerization in aqueous emulsion to obtain a latex, subjecting said latex, while in the freshly prepared and unstabilized condition, to the action of an oxygen supplying agent for a time sufficient to increase the plasticity and mechanical strength of the rubbery copolymer contained in said latex, adding an antioxidant to said latex and finally coagulating said latex to yield the copolymer.

6. The method of improving the properties of an elastic rubbery copolymer contained in a latex prepared by the polymerization in aqueous emulsion of a mixture including butadiene-1,3 and a minor proportion of acrylonitrile which comprises subjecting said latex, while in the freshly prepared and unstabilized condition, to the action of an oxygen supplying agent for a time sufficient materially to increase the plasticity of the copolymer contained in said latex and thereafter stabilizing said latex by the addition of an antioxidant.

7. The method of improving the properties of an elastic rubbery copolymer contained in a latex prepared by the polymerization in aqueous emulsion of a mixture including butadiene-1,3 and a minor proportion of acrylonitrile which comprises subjecting said latex, while in the freshly prepared and unstabilized condition, to oxidizing conditions until from 0.02 to 0.2 part by weight of oxygen are absorbed for each 100 parts by weight of copolymer contained in said latex, and thereafter stabilizing said latex by the addition of an antioxidant.

8. The method of improving the properties of an elastic rubbery copolymer contained in a latex prepared by the polymerization in aqueous emulsion of a mixture of butadiene-1,3 and a lesser amount of acrylonitrile which comprises bubbling an oxidizing gas through said latex, while in the freshly prepared and unstabilized condition, until from 0.02 to 0.2 part by weight of oxygen are absorbed for each 100 parts by weight of copolymer present in the latex, and thereafter stabilizing said latex by the addition of an antioxidant.

9. The method of improving the properties of an elastic rubbery copolymer contained in a latex prepared by the polymerization in aqueous emulsion of a mixture of butadiene-1,3 and a lesser amount of acrylonitrile which comprises subjecting said latex, while in the freshly prepared and unstabilized condition, to the action of an oxidizing atmosphere until from 0.02 to 0.2 part by weight of oxygen are absorbed for each 100 parts by weight of copolymer present in the latex, and thereafter stabilizing said latex by the addition of an antioxidant.

10. The method of improving the properties of an elastic rubbery copolymer contained in a latex prepared by the polymerization in aqueous emulsion of a mixture of butadiene-1,3 and a lesser amount of acrylonitrile which comprises adding a substantially neutral oxygen liberating compound to said latex, while in the freshly prepared and unstabilized condition, in such amount that 0.02 to 0.2 part by weight of oxygen are liberated for each 100 parts by weight of copolymer present in the latex, allowing said latex to stand from 4 to 24 hours, and thereafter stabilizing said latex by the addition of an antioxidant.

11. The method of improving the properties of an elastic rubbery copolymer contained in a latex prepared by the polymerization in aqueous emulsion of a mixture of butadiene-1,3 and a lesser amount of acrylonitrile which comprises bubbling ozone into said latex, while in the freshly prepared and unstabilized condition until from 0.02 to 0.2 part by weight of oxygen are absorbed for each 100 parts by weight of copolymer present in the latex, and thereafter stabilizing said latex by the addition of an antioxidant.

12. The method of improving the properties of an elastic rubbery copolymer contained in a latex prepared by the polymerization in aqueous emulsion of a mixture of butadiene-1,3 and a lesser amount of acrylonitrile which comprises adding hydrogen peroxide to said latex, while in the freshly prepared and unstabilized condition, in such amount that from 0.02 to 0.2 part by weight of oxygen are liberated for each 100 parts of copolymer present in the latex, allowing said latex to stand from 4 to 24 hours, and thereafter stabilizing said latex by the addition of an antioxidant.

13. As a new product, a latex prepared by the polymerization in aqueous emulsion of a mixture of a conjugated butadiene hydrocarbon and a minor proportion of an unsaturated organic compound copolymerizable therewith in aqueous emulsion to form an elastic rubbery copolymer, said latex containing an elastic rubbery copolymer prepared by the said polymerization, the said elastic rubbery copolymer being oxidized to such an extent that its plasticity and mechanical strength are increased and being stabilized against further oxidation by the presence of an antioxidant.

14. As a new product, a latex prepared by the polymerization in aqueous emulsion of a mixture of butadiene-1,3 and a lesser amount of acrylonitrile, said latex containing an elastic rubbery copolymer of butadiene-1,3 and acrylonitrile prepared by said polymerization, the said copolymer being oxidized to such an extent that its plasticity and mechanical strength are increased and being stabilized against further oxidation by the presence of an antioxidant.

15. An elastic rubbery copolymer of improved plasticity and mechanical strength, said copolymer having been prepared by polymerizing in aqueous emulsion a mixture of a conjugated butadiene hydrocarbon and a minor proportion of an unsaturated organic compound copolymerizable therewith in aqueous emulsion to form an elastic rubbery copolymer, oxidizing the resulting latex for a time sufficient to increase the plasticity and mechanical strength of the copolymer contained therein, stabilizing the latex against further oxidation by the addition of an antioxidant and coagulating the latex.

VICTOR E. WELLMAN.